US00RE37513B1

(19) United States
(12) Reissued Patent
Tabata et al.

(10) Patent Number: US RE37,513 E
(45) Date of Reissued Patent: Jan. 15, 2002

(54) VEHICLE CONTROL APPARATUS HAVING MEANS FOR PREVENTING INTERFERENCE BETWEEN TRANSMISSION CONTROLS BY RUNNING STABILITY CONTROL MEANS AND MANUAL SHIFT CONTROL MEANS

(75) Inventors: Atsushi Tabata, Okazaki; Hideo Tomomatsu, Nagoya; Kagenori Fufkumura, Toyota; Hiroji Taniguchi, Okazaki, all of (JP)

(73) Assignee: Toyota Jidosha Kabushiki Kaisha, Toyota (JP)

(21) Appl. No.: 09/633,296

(22) Filed: Aug. 3, 2000

Related U.S. Patent Documents

Reissue of:
(64) Patent No.: 5,873,802
Issued: Feb. 23, 1999
Appl. No.: 08/956,098
Filed: Oct. 24, 1997

(30) Foreign Application Priority Data

Nov. 7, 1996 (JP) ..... 8-295167

(51) Int. Cl.[7] ..... B60K 41/26; F16H 61/02; F16H 61/10

(52) U.S. Cl. ..... 477/96; 180/197

(58) Field of Search ..... 477/92, 96; 180/197

(56) References Cited

U.S. PATENT DOCUMENTS

| | | | | |
|---|---|---|---|---|
| 5,113,718 A | * | 5/1992 | Sato | 180/197 |
| 6,077,190 A | | 6/2000 | Tabata et al. | |
| 6,125,321 A | | 9/2000 | Tabata et al. | |

FOREIGN PATENT DOCUMENTS

| | | |
|---|---|---|
| JP | 61-88058 | 5/1986 |
| JP | 4-266538 | 9/1992 |
| JP | 5-196118 | 8/1993 |
| JP | 8-142715 | 6/1996 |

* cited by examiner

*Primary Examiner*—Dirk Wright
(74) *Attorney, Agent, or Firm*—Oblon, Spivak, McClelland, Maier & Neustadt, P.C.

(57) ABSTRACT

A running stability controller is activated upon the instability of a vehicle and controls at least one of an output of an engine, a braking force applied to the vehicle and a gear ratio of an automatic transmission. A manual shifting controller which shifts the automatic transmission according to an operation of a manual shifter is provided. A running stability control detector detects the activation of the running stability controller. A manual shifting control inhibitor operates upon detection of the activation of the running stability controller, and inhibits an operation of the manual shifting controller while the running stability controller is activated.

11 Claims, 10 Drawing Sheets

FIG. 2

| POSITIONS | | | SOLENOID VALVES | | | CLUTCHES | | | BRAKES | | |
|---|---|---|---|---|---|---|---|---|---|---|---|
| | | | $S_1$ | $S_2$ | $S_3$ | $C_1$ | $C_2$ | $C_0$ | $B_1$ | $B_2$ | $B_3$ | $B_0$ |
| D | AUTO | 1ST | ○ | × | × | ○ | × | ○ | × | × | × | × |
| | | 2ND | ○ | ○ | × | ○ | × | ○ | × | ○ | × | × |
| | | 3RD | × | ○ | × | ○ | ○ | ○ | × | ○ | × | × |
| | | 4TH | × | × | × | ○ | ○ | × | × | ○ | × | ○ |
| | MANU. | 1ST | ○ | × | ○ | ○ | × | ○ | × | × | ○ | × |
| | | 2ND | ○ | ○ | ○ | ○ | × | ○ | ○ | ○ | × | × |
| | | (3RD) | × | ○ | ○ | ○ | ○ | ○ | × | ○ | × | × |
| | | (4TH) | × | × | ○ | ○ | ○ | × | × | ○ | × | ○ |

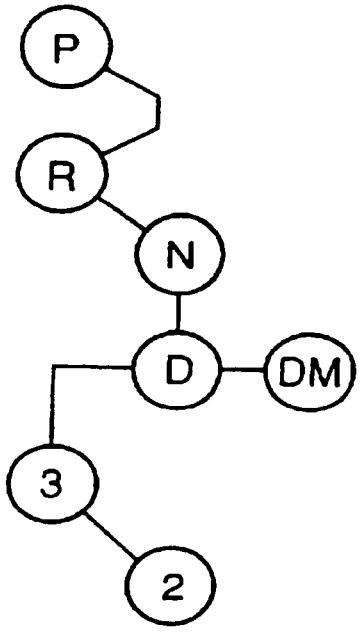
FIG. 5
FIG. 6
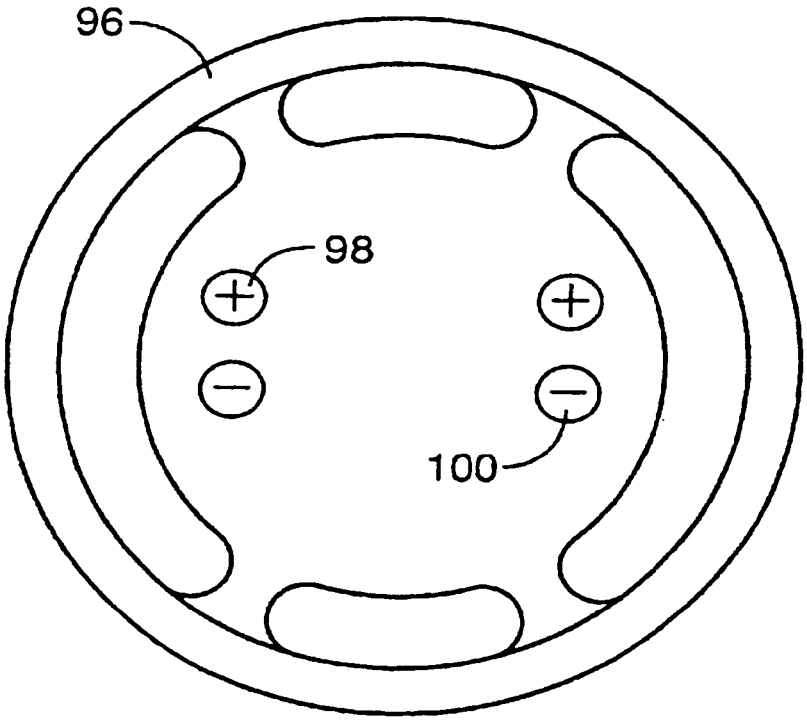

VEHICLE CONTROL APPARATUS HAVING MEANS FOR PREVENTING INTERFERENCE BETWEEN TRANSMISSION CONTROLS BY RUNNING STABILITY CONTROL MEANS AND MANUAL SHIFT CONTROL MEANS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates in general to an apparatus for controlling an automotive vehicle, more specifically, a vehicle control apparatus for controlling an engine, an automatic transmission and other devices of the vehicle. More particularly, the present invention is concerned with means for preventing an interference between running stability control means and manual transmission shifting control means.

2. Discussion of the Related Art

An automotive vehicle may fall in an unstable running condition, in particular, an unstable turning condition, with the lateral road gripping capacity of a wheel tire being exceeded during turning of the vehicle on a road surface having a relatively low friction coefficient, or at a relatively high speed, or to clear an obstacle, for example. The unstable running condition may be an oversteering or understeering tendency of the vehicle. The oversteering tendency is caused when the road gripping force of the rear wheels is considerably smaller than that of the front wheels, resulting in an excessively larger turning angle of the vehicle than the steering angle, and leading to a spinning tendency of the vehicle. On the other hand, the understeering tendency is caused when the road gripping force of the front wheels is considerably smaller than that of the rear wheels, resulting in a considerably smaller turning angle of the vehicle than the steering angle.

To cope with such running instability of the vehicle, there has been proposed running stability control means in the form of a turning stability control apparatus for stabilizing the vehicle turning behavior, such as a vehicle stability control system (VSC system) as disclosed in JP-A-4-266538. Such a turning stability control apparatus is activated when the vehicle turning condition is unstable, namely, when an oversteering or understeering tendency of the vehicle is detected. Described in detail, the apparatus is adapted to reduce the engine output and at the same time apply a braking force to an appropriate one or ones of the front and rear wheels, for producing a moment that reduces the oversteering or understeering tendency of the vehicle, thereby to stabilize the turning behavior of the vehicle.

The turning stability control apparatus may be further adapted to maintain the automatic transmission in the presently established position or shift up or down the automatic transmission, so as to improve the turning stability of the vehicle. The automotive vehicle equipped with the turning stability control apparatus may also be equipped with manual shifting control means which is adapted to shift the automatic transmission in response to an operation of a manual shifting device while a manual shift mode is selected. This type of vehicle may suffer from some drawbacks due to interferences or inadequate coordination between an operation of the turning stability control apparatus and an operation of the manual shifting control means, in relation to the shifting of the automatic transmission.

For instance, a drawback may arise if the automatic transmission is commanded by the manual shifting control means to shift the automatic transmission by manipulation of the manual shifting device in the manual shift mode while the automatic transmission is commanded by the turning stability control apparatus to maintain the presently established position for improving the turning stability of the vehicle. In this case, the automatic transmission may be shifted according to the command generated by the manual shifting control means, contrary to the command generated by the turning stability control apparatus to hold the automatic transmission in the presently established position.

The manual shifting means may be adapted such that the number of the selectable forward-drive operating positions of the automatic transmission which can be established for forward running of the vehicle can be changed by operation of the manual shifting device in the manual shift mode. Generally, the shift lever has two or more forward-drive positions such as "D", "3" and "2", and the hydraulic control device for the automatic transmission has range positions corresponding to the forward-drive positions of the shift lever. As the shift lever is operated from the position "D" to the position "3" and then to the position "2", the number of the selectable forward-drive operating positions of the automatic transmission is reduced, for example, from "4" to "3" and from "3" to "2". When the manual shifting device is operated, the range position of the hydraulic control device is electrically changed, and the number of the forward-drive operating positions of the automatic transmission is changed. If the manual shifting device is operated to change the number of the selectable forward-drive operating positions of the automatic transmission from "4" to "3", for instance, the automatic transmission may be automatically shifted down from a fourth-speed position to a third-speed position, for example, as in the case where the shift lever is operated from the position "D" to the position "3". Thus, the manual shifting device may be used to indirectly shift down or up the automatic transmission without operating the shift lever, by electrically changing the range position of the hydraulic control device. In this case, too, the vehicle control apparatus suffers from the drawback as described above with respect to the manual shifting means adapted to directly shift the automatic transmission.

SUMMARY OF THE INVENTION

It is therefore an object of the present invention to provide an apparatus for controlling an automotive vehicle, which apparatus ameliorates the conventionally encountered drawbacks due to an interference or inadequate coordination between the operation of the running stability control means and the manual shifting control means.

The above object may be achieved according to the principle of this invention, which provides an apparatus for controlling an automotive vehicle having an engine and an automatic transmission having a plurality of hydraulically operated frictional coupling devices, the apparatus comprising: (a) running stability control means operated upon reduction of stability of running of the vehicle below a predetermined threshold, for controlling at least one of an output of the engine, a braking force applied to the vehicle and an established position of the automatic transmission, so as to improve the stability of running of the vehicle; (b) manual shifting control means responsive to an operation of a manual shifting device, for shifting the automatic transmission; (c) running stability control detecting means for detecting an operation of the running stability control means; and (d) manual shifting control inhibiting means, operable upon detection of the operation of the running stability control means by the running stability control detecting means, for inhibiting an operation of the manual shifting control means while the running stability control means is operated to control said automatic transmission.

In the vehicle control apparatus of the present invention constructed as described above, the manual shifting control inhibiting means is operated upon detection by the running stability control detecting means of the operation of the running stability control means, to inhibit the operation of the manual shifting control means while the running stability control means is operated to control the automatic transmission. This arrangement prevents the conventionally encountered drawbacks due to interferences between the operation of the running stability control means and the operation of the manual shifting control means, in relation to the control of the automatic transmission. If, for example, the running stability control means generates a transmission hold command for holding the automatic transmission in the presently established position while the manual shifting device generates a manual shifting command to shift up or down the automatic transmission, the manual shifting control inhibiting means inhibits the operation of the manual shifting control means according to the manual shifting command, so that the automatic transmission is held in the presently established position according to the transmission hold command generated by the turning stability control means. Therefore, the running stability of the vehicle is not deteriorated by the shift-u or shift-down action of the automatic transmission according to the manual shifting command.

In one preferred form of the present invention, the apparatus further comprises: shift control means connected to the running stability control means and the manual shifting control means, for controlling the automatic transmission, the shift control means having an automatic shift mode in which the automatic transmission is automatically shifted depending upon a running condition of the vehicle, and a manual shift mode in which the manual shifting device is operable; and shift mode determining means for determining whether the shift control means is placed in the automatic shift mode or in the manual shift mode. In this form of the invention, the manual shifting control means commands the shift control means to shift the automatic transmission according to a manual shifting command generated by the manual shifting device when the shift mode determining means determines that the shift control means is placed in the manual shift mode, and the manual shifting control inhibiting means inhibiting the operation of the manual shifting control means according to the manual shifting command while the running stability control means is operated to control the automatic transmission.

In another preferred form of the invention, the apparatus further comprises: hydraulic control device for controlling the plurality of hydraulically operated frictional coupling devices, the hydraulic control device having a plurality of range positions which are selectively established and in which the automatic transmission have respective different numbers of forward-drive positions that can be established; shift control means connected to the the hydraulic control device, the running stability control means, the manual shifting control means, for controlling the frictional coupling devices of the automatic transmission, the shift control means having an automatic shift mode in which the automatic transmission is automatically shifted depending upon a running condition of the vehicle, and a manual shift mode in which the manual shifting device is operable; and shift mode determining means for determining whether the shift control means is placed in the automatic shift mode or in the manual shift mode. In this form of the invention, the manual shifting control means commands the shift control means to select one of the plurality of range positions of the hydraulic control device according to a manual shifting command generated by the manual shifting device when the shift mode determining means determines that the shift control means is placed in the manual shift mode, and the manual shifting control inhibiting means inhibiting the operation of the manual shifting control means according to the manual shifting command while the running stability control means is operated to control the automatic transmission.

In the above preferred form of the invention, the hydraulic control device may have: a first range position in which the automatic transmission can be shifted to any one of four forward-drive positions thereof consisting of a first-speed, a second-speed, a third-speed and a fourth-speed position; a second range position in which the automatic transmission can be shifted to any one of the first-speed, second-speed and third-speed positions but cannot be shifted to the fourth-speed position which is the highest speed position of all the four forward-drive positions; and a third range position in which the automatic transmission can be shifted to either one of the first-speed and second-speed positions but cannot be shifted to the third-speed and fourth-speed positions. If the manual shifting device is operated in the manual shift mode to generate a manual shifting command for controlling the hydraulic control device to newly establish the second range position while the first range position is established, the shift control means shifts down the automatic transmission from the fourth-speed position to the third-speed position if the automatic transmission is placed in the fourth-speed position when the manual shifting command is generated. Thus, the shift control means may shift the automatic transmission according to the manual shifting command generated by the manual shifting device in the manual shift mode for changing the range position of the hydraulic control device.

In a further preferred form of the invention, the manual shifting control device is operated to generate a manual shifting command for shifting the automatic transmission in the manual shift mode, and the running stability control means generates a stability control command for controlling the automatic transmission for improving the stability of running of the vehicle, and wherein the manual shifting control inhibiting means cancelling the manual shifting command to thereby inhibit the operation of the manual shifting control means while the stability control command is generated by the running stability control means. In this form of the invention, the manual shifting control means cancels or invalidates the manual shifting command which is generated by the manual shifting device. Thus, the manual shifting control inhibiting means gives priority to the running stability control operation by the running stability control means, to the manual shifting action of the automatic transmission under the control of the manual shifting control means according to the manual shifting command. Since the manual shifting command is cancelled and is not executed even after the shifting or holding of the automatic transmission according to the stability control command or even after the termination of the operation of the running stability control means.

In a still further preferred form of this invention, the apparatus further comprises transmission holding means operable when the running stability control detecting means detects that the operation of the running stability control means is terminated. This transmission holding means is adapted to hold the automatic transmission in a position thereof which is established upon termination of the operation of the running stability control means. In this form of the invention, the automatic transmission is held in the last established position until the manual shifting control means is operated according to a manual shifting command subsequently generated by the manual shifting device. Accordingly, the transmission holding means is effective to prevent an unnecessary shifting action of the automatic transmission immediately after the termination of the running stability control operation by the running stability control means.

In a yet further preferred form of the invention, the manual shifting control device is operated to generate a manual shifting command for shifting the automatic transmission in the manual shift mode, and the running stability control means generates a stability control shifting command for shifting the automatic transmission for improving the stability of running of the vehicle. In this form of the invention, the manual shifting control inhibiting means is adapted to cancel the manual shifting command generated by the manual shifting device if a shifting direction in which the automatic transmission is to be shifted according to the manual shifting command is the same as a shifting direction in which the automatic transmission is to be shifted according to the stability control shifting command generated by the running stability control means. Further, the manual shifting control inhibiting means permits the automatic transmission to be shifted according to the stability control shifting command, if the shifting direction according to the manual shifting command is the same as the shifting direction according to the stability control shifting command.

In still another preferred form of the invention, the manual shifting control device is operated to generate a manual shifting command for shifting the automatic transmission in the manual shift mode, and the running stability control means generates a stability control shifting command for shifting the automatic transmission for improving the stability of running of the vehicle, as in the above form of the invention. In this form of the invention, the manual shifting control inhibiting means permits the automatic transmission to be shifted according to the stability control shifting command generated by the running stability control means, if a shifting direction in which the automatic transmission is to be shifted according to the stability control shifting command is opposite to a shifting direction in which the automatic transmission is to be shifted according to the manual shifting command. However, the manual shifting control inhibiting means is adapted to hold the manual shifting command effective so that the automatic transmission is shifted according to the manual shifting command after the operation of the running stability control means. In this arrangement, the manual shifting command is not cancelled or invalidated by the manual shifting control inhibiting means, but is held effective so that the automatic transmission is shifted according to this manual shifting command after the shifting action of the automatic transmission according to the stability control shifting command or after the operation of the running stability control means.

BRIEF DESCRIPTION OF THE DRAWINGS

The above and optional objects, features, advantages and technical and industrial significance of the invention will be better understood by reading the following detailed description of presently preferred embodiments of the invention, when considered in connection with the accompanying drawings, in which:

FIG. 2 is a view indicating a relationship between combinations of operating states of frictional coupling devices of the automatic transmission and respective operating positions of the automatic transmission;

FIG. 5 is a view showing the positions of a shift lever provided on the vehicle;

FIG. 6 is a view showing a manual shifting device in the form of shift-up and shift-down switches provided on a steering wheel of the vehicle;

DETAILED DESCRIPTION OF THE PREFERRED EMBODIMENTS

Figure 1:
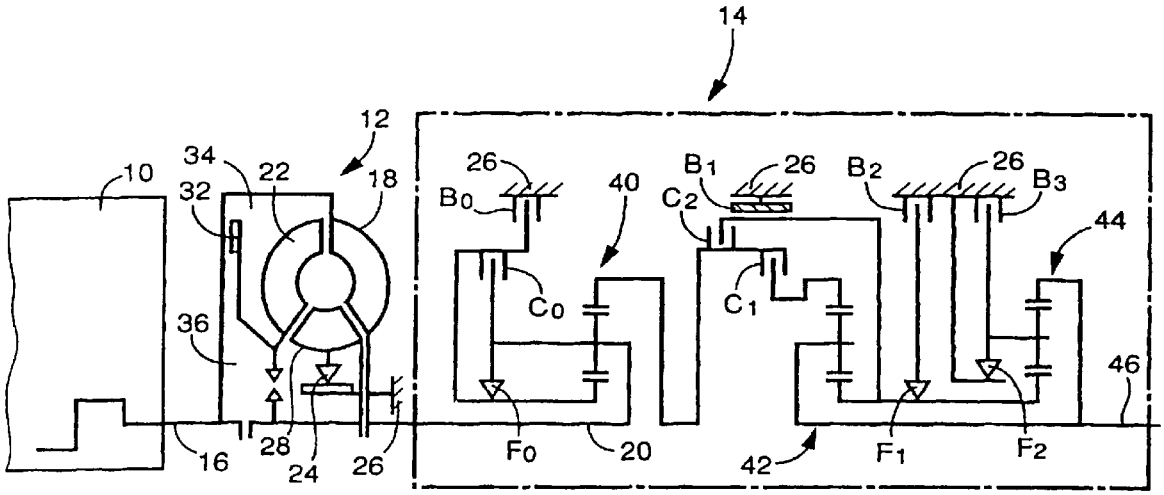
FIG. 1 is a schematic view of a power transmitting system of an automotive vehicle including an engine and an automatic transmission which are controlled by a vehicle control apparatus constructed according to one embodiment of this invention.

Referring first to the schematic view of FIG. 1, the power transmitting system shown therein includes a fluid-operated power transmitting device in the form of a torque converter 12 connected to an engine 10, and an automatic transmission 14 connected to the torque converter 12. An output of the engine 10 is transmitted to drive wheels of the automotive vehicle through the torque converter 12, automatic transmission 14 and a differential gear device as well known in the art. The torque converter 12 includes a pump impeller 18 connected to a crankshaft 16 of the engine 10, a turbine impeller 22 connected to an input shaft 20 of the automatic transmission 14, a stator impeller 28 connected through a one-way clutch 24 to a stationary member in the form of a housing 26, and a lock-up clutch 32 connected through a damper to the input shaft 20. The lock-up clutch 32 is placed in a fully released position when the pressure in a releasing oil chamber 36 of the torque converter 12 is higher than that in an engaging oil chamber 34 of the torque converter 12, and in a fully engaged position when the pressure in the engaging oil chamber 34 is higher than that in the releasing oil chamber 36. With the lock-up clutch 32 placed in the fully released position, the torque received by the torque converter 12 is amplified at a ratio corresponding to a ratio of the input speed of the torque converter 12 to the output speed, and the thus amplified torque is transmitted to the automatic transmission 14 through the input shaft 20. With the lock-up clutch 32 placed in the fully engaged position, the output of the engine 10 received by the lock-up clutch 32 through the crankshaft 16 is directly transmitted to the automatic transmission 14 through the input shaft 20.

The automatic transmission 14 includes first, second and third planetary gear sets 40, 42, 44 of single pinion type which are disposed coaxially with each other. The automatic transmission 14 further includes an output shaft 46 connected to a carrier of the second planetary gear set 42 and a ring gear of the third planetary gear set 44. Some rotary elements of the three planetary gear sets 40, 42, 44 are integrally connected to each other, and the other rotary elements are selectively connected to each other through three clutches C0, C1, C2 or selectively fixed to the housing 26 through four brakes B0, B1, B2 and B3. Three one-way clutches F0, F1 and F2 are provided for selective connection of the above-indicated other rotary elements to each other through the clutches C0, C1, C2 or for selective fixing thereof to the housing 26 through the brakes B0–B3, depending upon the direction of rotation of the input member of each one-way clutch.

Since the torque converter 12 and the automatic transmission 14 are symmetrical with respect to their axes, only the upper halves of the torque converter and automatic transmission are shown in FIG. 1.

Figure 3:
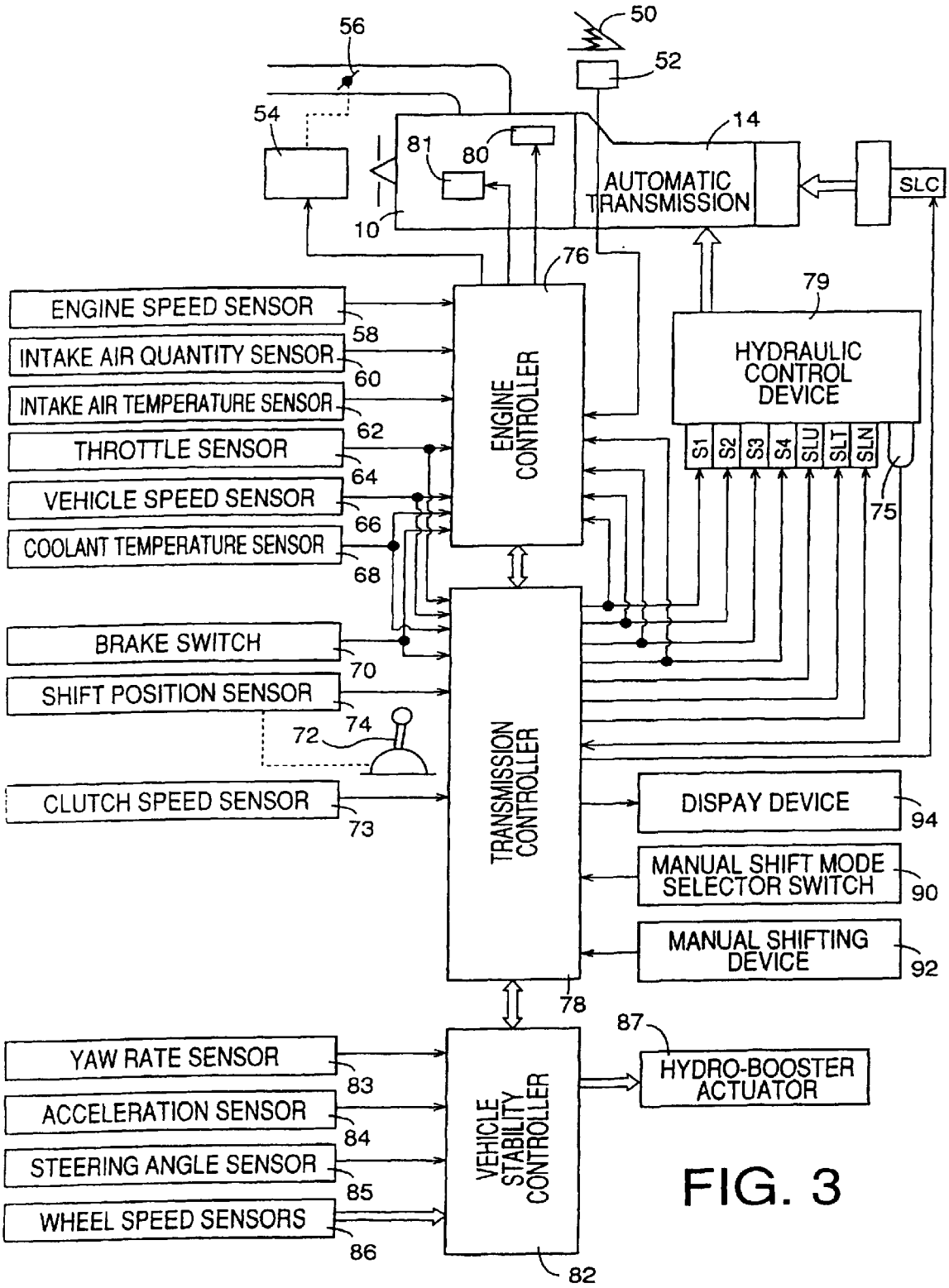
FIG. 3 is a block diagram illustrating an electrical system and a hydraulic control system of the vehicle control apparatus.

The clutches C0, C1, C2 and brakes B0–B3 (generally referred to as clutches C and brakes B) are frictional coupling devices such as multiple-disk clutches or band brakes, which are actuated (engaged and released) by suitable hydraulic actuators operated by a pressurized working fluid supplied from a hydraulic control device 79 (FIG. 3). The hydraulic control device 79 is provided with a large number of switch valves including solenoid-operated valves S1, S2 whose solenoids are selectively energized or deenergized according to control signals received from an electronic transmission controller 78 (FIG. 3), so that the clutches C and brakes B are selectively engaged to establish a selected one of four forward-drive positions "1st", "2nd", "3rd" and "4th" of the automatic transmission 14, as indicated in the table FIG. 2. The hydraulic control device 79 further includes a linear solenoid valve SLU whose solenoid is energized or deenergized according to a control signal from the transmission controller 78, so that the lock-up clutch 32 is fully engaged or fully released, or placed in a partially engaged state.

The automotive vehicle has a shift lever 72 disposed adjacent to a driver's seat. The shift lever 72 has seven operating positions "P", "R", "N", "DM", "D", "3" and "2". Of these seven operating positions, the positions "D", "3" and "2" are forward-drive positions, i.e., DRIVE position "D", THIRD position "3" and SECOND position "2". With the shift lever 72 placed in the DRIVE position "D", the automatic transmission 14 can be shifted to any one of the four drive positions, namely, first-speed position "1st", second-speed position "2nd", third-speed position "3rd" and fourth-speed or overdrive position "4th". With the shift lever 72 placed in the THIRD position "3", the automatic transmission 14 can be shifted to any one of the three forward drive positions "1st", "2nd" and "3rd", but the fourth-speed position "4th" is not available. With the shift lever 72 placed in the SECOND position "2", the automatic transmission 14 can be shifted to the first-speed position "1st" or the second-speed position "2nd", but the fourth-speed and third-speed positions "4" and "3" are not available.

When the shift lever 72 is operated to one of the THIRD and SECOND positions "3", "2" (referred to as "engine braking positions", the solenoid-operated valve S3 is energized, and the brake B1 or B3 is engaged to apply an engine brake to the vehicle. The engine brake is also applied when the automatic transmission 14 is shifted to the first-speed or second-speed position "1st" or "2nd" while a manual shift mode is established by operating the shift lever 72 from the DRIVE position "D" to the position "DM", as described below.

In the table of FIG. 2, "o" represents the energized state of the solenoids of the solenoid-operated valves S1–S3 or the engaged state of the clutches and brakes C, B, while "x" represents the deenergized state of the solenoids or the released state of the clutches and brakes C, B.

As shown in FIG. 3, the vehicle control apparatus includes: an electronic engine controller 76 for controlling the engine 10; the above-indicated electronic transmission controller 78 for controlling the lock-up clutch 32 and the automatic transmission 14 as described above, and an electronic vehicle stability controller 82 for controlling a hydro-booster actuator 87 which will be described. The vehicle control apparatus uses various sensors including: an accelerator sensor 52 for detecting an amount of operation of an accelerator pedal 50, which amount is used to operate a throttle actuator 54 for controlling a throttle valve 56 disposed in an intake pipe of the engine 10; an engine speed sensor 58 for detecting a speed $N_E$ of the engine 10; an intake air quantity sensor 60 for detecting an intake air quantity Q/N of the engine 10; an intake air temperature sensor 62 for detecting a temperature $T_A$ of an intake air of the engine 10; a throttle sensor 64 for detecting an opening angle $\theta_{TH}$ of the throttle valve 56; a vehicle speed sensor 66 for detecting a speed $N_{OUT}$ of the output shaft 46 of the automatic transmission 14, which is used to obtain a running speed V of the vehicle; a coolant temperature sensor 68 for detecting a temperature $T_W$ of a coolant water of the engine 10; a BRAKE switch 70 for detecting an operating state BK of a braking system of the vehicle; a clutch speed sensor 73 for detecting a speed $N_{CO}$ of the clutch C0 of the automatic transmission 14 (which is equal to the speed of the input shaft 20); a shift position sensor 74 for detecting a currently established position $P_{SH}$ of the shift lever 72; and an oil temperature sensor 75 for detecting a temperature $T_{OIL}$ of the working oil used for the hydraulic control device 79.

The engine and transmission controllers 76, 78 receive the output signals of the above-indicated various sensors, which represent the engine speed $N_E$, intake air quantity Q/N, intake air temperature $T_A$, throttle valve opening angle $\theta_{TH}$, output shaft speed $N_{OUT}$ (vehicle speed V), engine coolant temperature $T_W$, brake operating state BK, clutch speed $N_{CO}$ (input shaft speed), shift lever position $P_{SH}$, and working oil temperature $T_{OIL}$.

The engine controller 76 is constituted by a so-called microcomputer incorporating a central processing unit (CPU), a random-access memory (RAM), a read-only memory (ROM), and an input and output interface. The CPU operates to process the various input signals, according to control programs stored in the ROM while utilizing a temporary data storage function of the RAM. The engine controller 76 controls: a fuel injector valve 80 for controlling the amount of injection of a fuel into the engine 10; an ignitor 81 for controlling an ignition timing of the engine 10; a suitable by-pass valve for controlling the idling speed of the engine 10; and the throttle valve 56 through the throttle actuator 54, for effecting traction control well known in the art, that is, for controlling the drive forces applied to the vehicle drive wheels. The engine controller 76 is connected to the transmission controller 78, and to the electronic vehicle stability controller 82, so that each of these controllers 76, 78, 82 may receive the necessary signals from the other controllers.

The transmission controller 78 is also constituted by a so-called microcomputer similar to that of the engine controller 76. The CPU of the transmission controller 78 operates to process the input signals according to control programs stored in the ROM while utilizing a temporary data storage function of the RAM, for controlling the solenoid-operated valves S1, S2 and linear solenoid valve SLU described above, and linear solenoid valves SLT and SLN. The transmission controller 78 controls the linear solenoid valve SLT so as to generate a THROTTLE pressure $p_{TH}$ corresponding to the opening angle $\theta_{TH}$ of the throttle valve 52, and controls the linear solenoid valve SLN so as to control an accumulator back pressure. As indicated above, the transmission controller 78 controls the linear solenoid valve SLU for fully engaging or releasing the lock-up clutch 32 or controlling the amount of slip of the lock-up clutch 32. Further, the transmission controller 78 is adapted to determine whether the automatic transmission 14 should be shifted from the currently established position to another position. This determination is effected on the basis of the detected throttle opening angle $\theta_{TH}$(%) and vehicle speed V, and according to predetermined shift boundary patterns. The shift boundary patterns may be shift boundary lines as indicated in FIG. 5 by way of example. The shift boundary lines are represented by data maps stored in the ROM of the transmission controller 78. To shift up or shift down the automatic transmission 14, the transmission controller 78 controls the solenoid-operated valves S1, S2 as indicated in FIG. 2.

As shown in FIG. 3, the vehicle stability controller 82 is adapted to receive the output signals of a yaw rate sensor 83, an acceleration sensor 84, a steering angle sensor 85 and four wheel speed sensors 86. The output signal of the yaw rate sensor 83 represents a yaw rate $\omega_Y$ of the vehicle body, i.e., an angular velocity about the vertical axis. The output signal of the acceleration sensor 84 represents an acceleration value G of the vehicle body in the longitudinal direction. The output signal of the steering angle sensor 85 represents a steering angle $\theta_W$, i.e., an angle of rotation of a steering wheel of the vehicle. The output signals of the wheel speed sensors 86 represent rotating speeds $N_{W1}$–$N_{W4}$ of the four wheels of the vehicle, respectively. The vehicle stability controller 82 is also constituted by a microcomputer similar to those of the controllers 76, 78. The CPU of the vehicle stability controller 82 operates to process the input signals according to control programs stored in the ROM while utilizing a temporary data storage function of the RAM, for controlling the throttle valve 56 through the throttle actuator 54, and for controlling suitable solenoid-operated brake control valves provided in the hydro-booster actuator 87, to apply a brake to an appropriate one or one of the four wheels. The hydro-booster actuator 87, which is incorporated in the hydraulic braking system, is capable of controlling the braking forces acting on the individual wheels as needed, independently of each other. As indicated above, the vehicle stability controller 82 is connected to the engine and transmission controllers 76, 78, for receiving the necessary signals from the controllers 76, 78.

Figure 4:
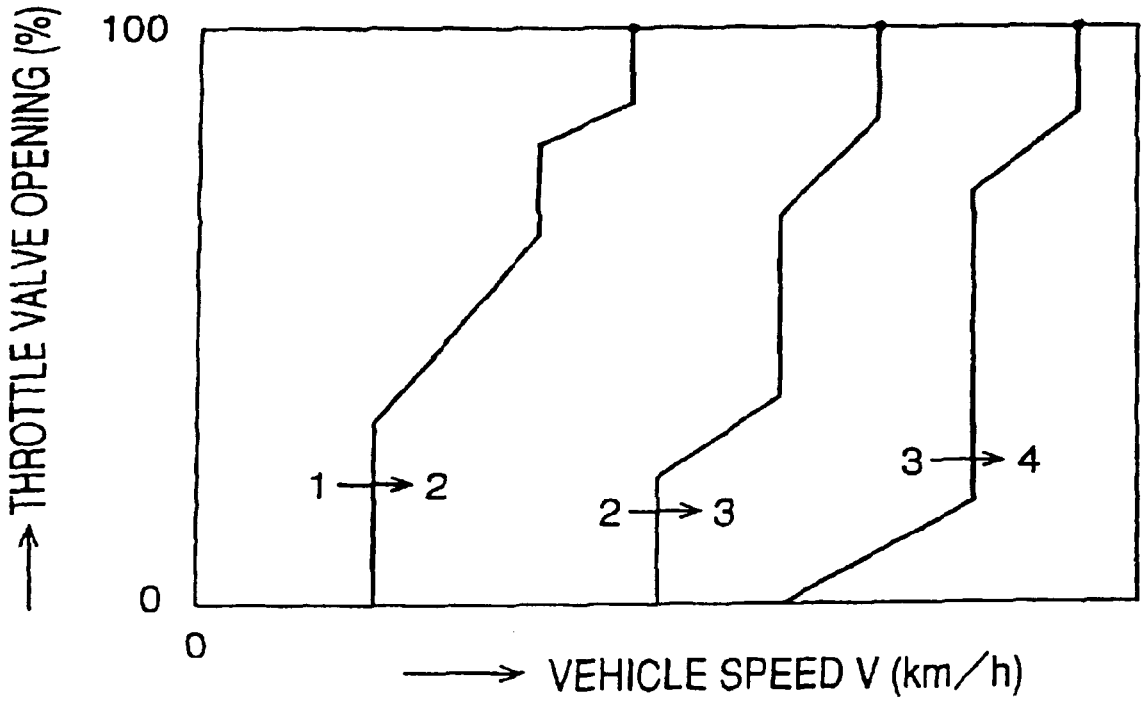
FIG. 4 is a view indicating examples of shift boundary lines used by a transmission controller of the vehicle control apparatus.

To the transmission controller 78, there are also connected a MANUAL SHIFT MODE selector switch 90 for selecting a manual shift mode, a manual shifting device 92 operable in the manual shift mode, and a display device 94 for displaying various kinds of information. The transmission controller 78 is normally placed in an automatic shift mode. When the MANUAL SHIFT mode selector switch 90 is turned ON, the transmission controller 78 is placed in the manual shift mode. In the automatic shift mode, the transmission controller 78 automatically shifts the automatic transmission 14 on the basis of the running condition of the vehicle and according to predetermined shift boundary lines. In the present embodiment, the transmission controller 78 placed in the automatic shift mode is adapted to automatically shift the automatic transmission 14 on the basis of the opening angle $\theta_{TH}$ (%) of the throttle valve 56 and the vehicle running speed V and according to one of the predetermined shift boundary lines which corresponds to the presently established position of the automatic transmission 14. Examples of the shift-up boundary lines are shown in FIG. 4. Each of these shift-up boundary lines is a relationship between the throttle opening angle $\theta_{TH}$ (%) and the vehicle speed V. When the automatic transmission 14 is placed in the first-speed position "1st", the 1–2 shift-up boundary line is used to determine whether the automatic transmission 14 should be shifted up from the first-speed position "1st" to the second-speed position "2nd". This determination is effected depending upon whether a point represented by the detected throttle opening angle $\theta_{TH}$ and vehicle speed V is on the left or right side of the 1–2 shift boundary line.

The manual shifting device 92 includes a pair of shift-up switches 98 and a pair of shift-down switches 100 provided on a steering wheel 96 of the vehicle, as shown in FIG. 6. When the transmission controller 78 is placed in the manual shift mode with the switch 90 being turned ON, the automatic transmission 14 is shifted up or down when the right or left shift-up or shift-down switch 98, 100 is turned ON.

The shift lever 72 is pivotally supported by a suitable mechanism so that the shift lever 72 is selectively operated to its positions "P", "R", "N", "DM", "D", "3" and "2", as shown in FIG. 5. When the shift lever 72 is operated to the position "DM", the MANUAL SHIFT MODE selector switch 90 is turned ON to place the transmission controller 78 in the manual shift mode, so that the shift-up and shift-down switches 98, 100 on the steering wheel 96 are operable to manually shift up or down the automatic transmission 14 as desired by the vehicle operator.

Figure 7:
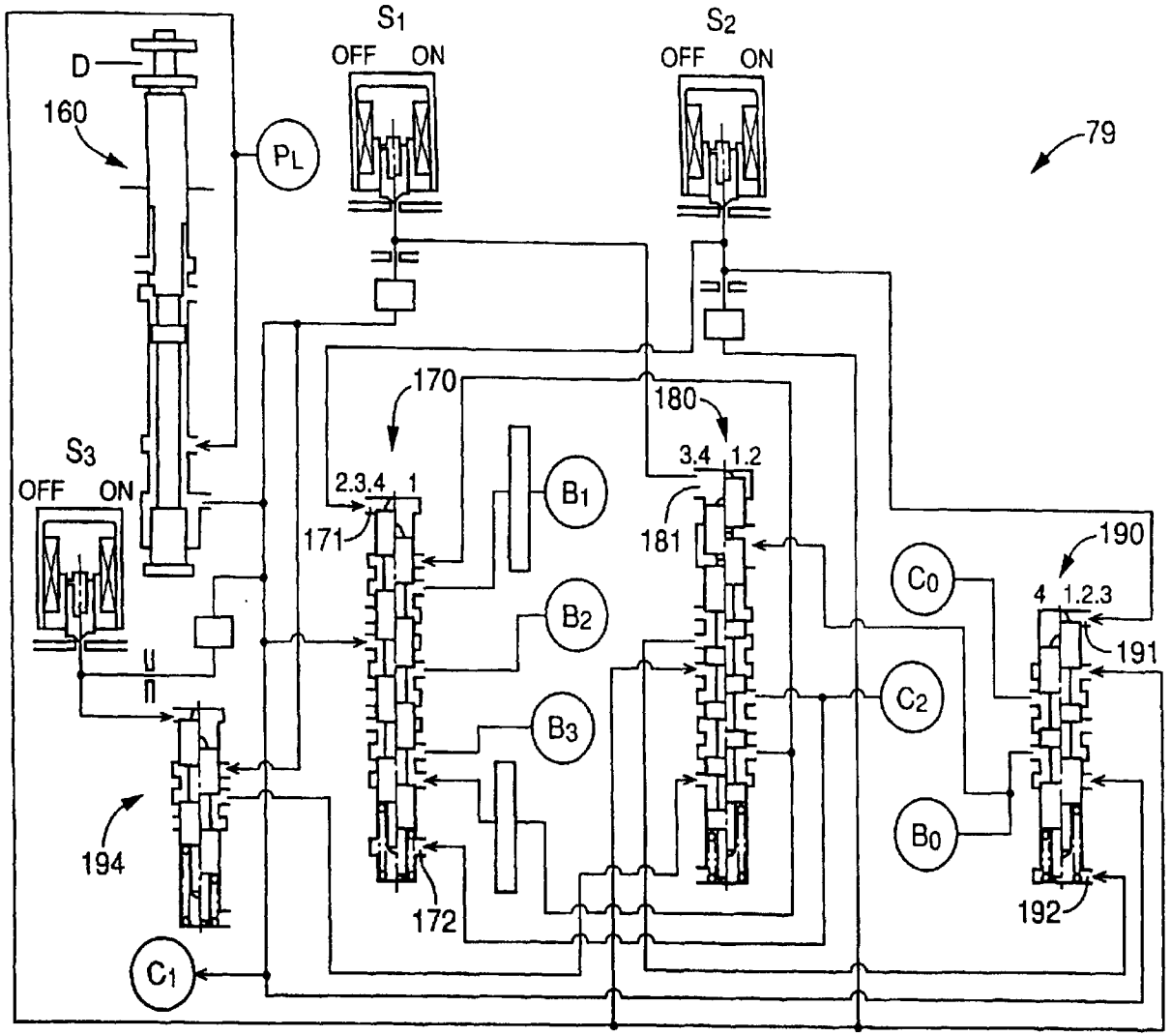
FIG. 7 is a view showing a part of the hydraulic control system.

Referring to FIG. 7 showing a portion of the hydraulic control device 79, there is shown a manual valve 160 which is mechanically linked with the shift lever 72. The manual valve 160 has six positions corresponding to the six positions "P", "R", "N", "D", "3" and "2" of the shift lever 72. Line pressure PL received by the manual valve 160 is produced from an output port depending upon the presently selected position of the manual valve 160. The hydraulic control device 79 further includes a 1–2 shift valve 170, a 2–3 shift valve 180, a 3–4 shift valve 190 and a coasting brake cut-off valve 194.

The 1–2 shift valve 170 has a control port 171 adapted to receive a pilot pressure from the second solenoid-operated valve S2, and a hold port 172 adapted to receive a hydraulic pressure in the second clutch C2. The 1–2 shift valve 170 is selectively placed in a position indicated at right in FIG. 7 for placing the automatic transmission 14 in the first-speed position "1st", and in a position indicated at left in FIG. 7 for placing the automatic transmission 14 in one of the second-speed, third-speed and fourth-speed positions "2nd", "3rd" and "4th". That is, the 1–2 shift valve 170 is selectively placed in one of its two positions for selectively engaging or releasing the first, second and third brakes B1–B3.

The 2–3 shift valve 180 has a control port 181 adapted to receive a pilot pressure from the first solenoid-operated valve S1, so that the 2–3 shift valve 180 is selectively placed in a position indicated at right indicated in FIG. 7 for placing the automatic transmission in the first-speed or second-speed position "1st" or "2nd", and in a position indicated at left in FIG. 7 for placing the automatic transmission 14 in the third-speed or fourth-speed position "3rd" or "4th". The 2–3 shift valve 170 is selectively placed in one of its two positions for selectively engaging or releasing the second clutch C2. The 3–4 shift valve 190 has a control port 191 adapted to receive a pilot pressure from the second solenoid-operated valve S2, and a hold port 192 adapted to receive the line pressure PL.

The 3–4 shift valve 190 is selectively placed in a position indicated at right in FIG. 7 for placing the automatic transmission 14 in one of the first-, second- and third-speed positions "1st", "2nd" and "3rd", and in a position indicated at left in FIG. 7 for placing the automatic transmission 14 in the fourth-speed position "4th". The 3–4 shift valve 190 is placed in one of its two positions for selectively engaging or releasing the clutch C0 and brake B0.

The third solenoid-operated valve S3 is provided for controlling the coasting brake cut-off valve 194. When the automatic transmission 14 is placed in the first-speed or second-speed position "1st", "2nd" in the manual shift mode with the MANUAL SHIFT MODE selector switch 90 being turned ON with the shift lever 72 operated to the position "DM", the valve S3 is energized or turned on so that the line pressure PL is supplied from the coasting brake cut-off valve 194 to the first or third brake B1, B3 through the 2–3 shift valve 180 and the 1–2 shift valve 170, whereby the engine brake is applied to the vehicle.

Figure 8:
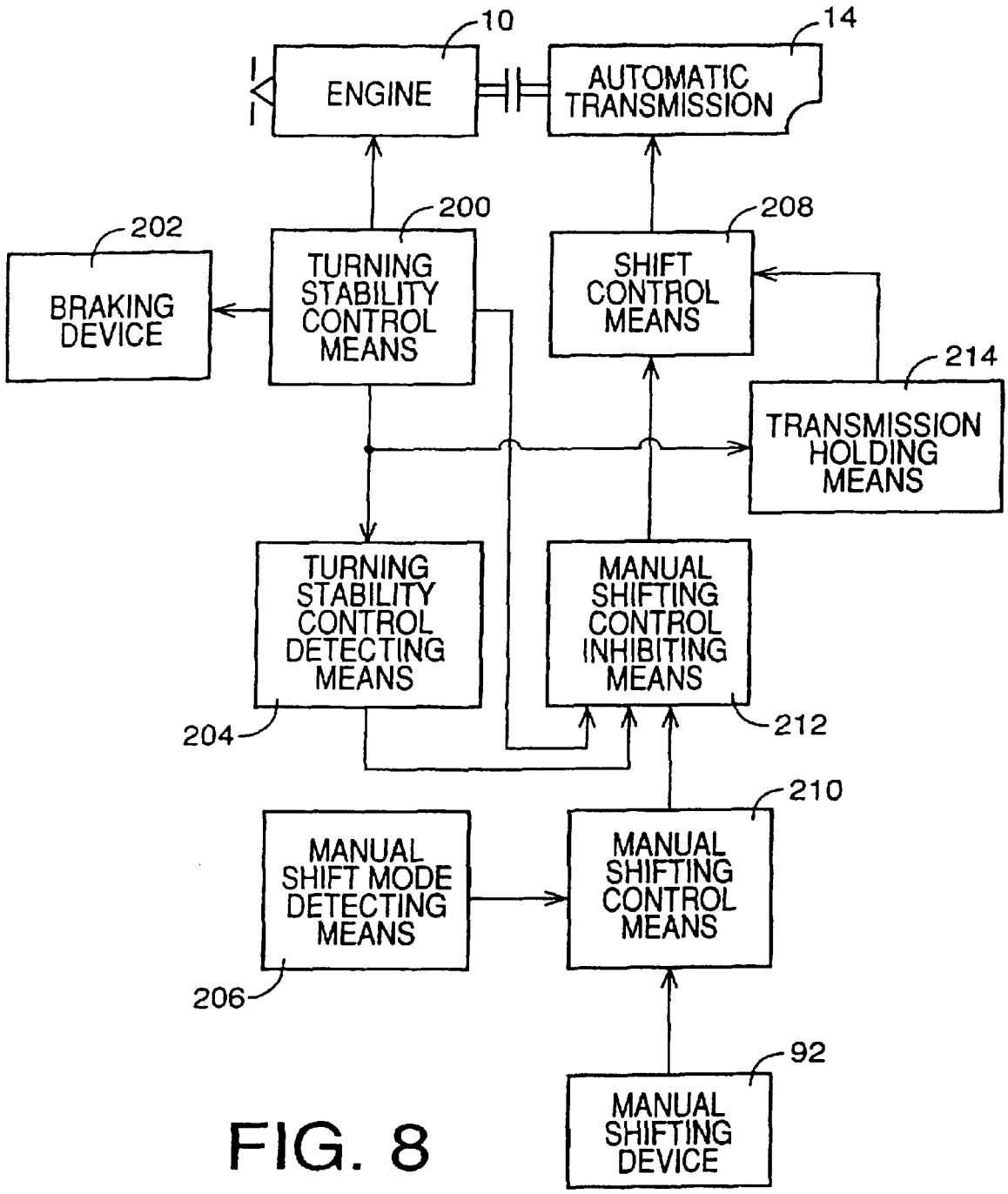
FIG. 8 is a block diagram illustrating various functional means of the vehicle control apparatus.

Referring to the block diagram of FIG. 8, there are shown functional means of the vehicle control apparatus including the engine and transmission controllers 76, 78 and vehicle stability controller 82. The vehicle control apparatus includes running stability control means in the form of turning stability control means 200. a braking device 202, running stability control detecting means in the form of turning stability control detecting means 204, shift mode determining means in the form of manual shift mode detecting means 206, shift control means 208, manual shifting control means 210, manual shifting control inhibiting means 212, and transmission holding means 214. The braking device 202 includes the hydro-booster actuator 87, which is capable of controlling the braking forces acting on the wheels of the vehicle as described above.

The turning stability control means 200 is operated upon reduction of turning stability of the vehicle below a predetermined threshold, for activating the braking device 202 (including the hydro-booster actuator 87) to apply a brake to an appropriate one or ones of the wheels (apply a controlled braking pressure to the appropriate wheel brake cylinder), or alternatively controlling the throttle actuator 54 to reduce the opening angle $\theta_{TH}$ of the throttle valve 56 for thereby reducing the output of the engine 10, so that the lateral slip of the wheels is reduced for increasing the stability of turning of the vehicle.

In the present embodiment, the turning stability control means 200 is adapted to determine that the vehicle is suffering from an oversteering tendency, if a slip angle $\beta$ between the longitudinal direction of the vehicle and the direction of movement of the gravity center of the vehicle is larger than a predetermined upper limit, while at the same time a rate of change $d\beta/dt$ of the slip angle $\beta$ is higher than a predetermined upper limit. In this case, the turning stability control means 200 commands the braking device 202 to brake one of the front wheels which is on the outer side of the turning path of the vehicle, in order to generate a moment for reducing the oversteering tendency and thereby improving the turning stability of the vehicle while at the same time lowering the vehicle speed V to increase the running stability. The turning stability control means 200 is further adapted to determine that the vehicle is suffering from an understeering tendency, if the detected yaw rate $\omega_Y$ of the vehicle is lower than a threshold determined by the steering angle $\theta_W$ and vehicle speed V. In this instance, the turning stability control means 200 commands the throttle actuator 54 to reduce the throttle opening angle $\theta_{TH}$ for reducing the engine output, and controls the braking device 202 to brake an appropriate one of the rear wheels, in order to generate a moment for reducing the understeering tendency and thereby improving the vehicle turning stability.

The turning stability control means 200 is also adapted to inhibit a shifting action of the automatic transmission 14 (maintain the automatic transmission 14 in the presently established position) or shift the automatic transmission 14 to a suitable position, for the purpose of improving the turning stability of the vehicle.

The turning stability control detecting means 204 is adapted to detect an operation of the turning stability control means 200, on the basis of the outputs of the vehicle stability controller 82, for example.

The manual shift mode detecting means 206 is adapted to determine whether the shift control means 208 is placed in the automatic shift mode or the manual shift mode. More specifically, the manual shift mode detecting means 206 is adapted to detect a change of the shift mode of the shift control means 208 from the automatic shift mode to the manual shift mode. That is, the manual shift mode detecting means 206 detects the operation of the shift lever 72 to the position "DM" or the activation of the MANUAL SHIFT MODE selector switch 90.

The shift control means 208 is adapted to select one of the operating positions of the automatic transmission 14, on the basis of the detected running condition of the vehicle and according to the predetermined shift boundary lines, as described above with respect to the automatic shift mode by reference to FIG. 4, which shows the shift-up boundary lines by way of example. When the vehicle is running with the automatic transmission 14 placed in the first-speed position "1st", for instance, the shift control means 208 determines whether the point defined by the detected throttle opening angle $\theta_{TH}$ and vehicle speed V is moved across the 1–2 shift-up boundary line from the left side of the line into the right side. If an affirmative decision is obtained in the above determination, the shift control means 208 energizes the solenoid-operated valve S2 as well as the solenoid-operated valve S1, to establish the second-speed position "2nd", that is, to shift up the automatic transmission 14 from the first-speed position "1st" to the second-speed position "2nd". Thus, the shift control means 208 is adapted to automatically shift the automatic transmission 14 from the currently established position to another, depending upon the detected running condition of the vehicle as represented by the throttle opening angle $\theta_{TH}$ and vehicle speed V, as compared with the predetermined shift boundary pattern which is represented by the shift boundary line corresponding to the currently established position.

When the shift lever 72 is placed in the THIRD position "3", the automatic transmission 14 cannot be shifted to the fourth-speed or overdrive position "4th". When the shift lever 72 is placed in the SECOND position "2", the automatic transmission 14 cannot be shifted to the third-speed and fourth-speed positions "3rd", "4th". Therefore, if the shift lever 72 is operated from the DRIVE position "D" to the THIRD position "3" while the automatic transmission 14 is in the fourth-speed position "4th", the shift control means 208 may determine that the automatic transmission 14 should be shifted down to the third-speed position "3rd". Similarly, if the shift lever 72 is operated from the THIRD position "3" to the SECOND position "2" while the automatic transmission 14 is in the third-speed position "3rd", the shift control means 208 may determine that the automatic transmission 14 should be shifted down to the second-speed position "2nd".

While only the shift-up boundary lines are illustrated in FIG. 4 by way of example, the shift control means 208 uses shift-down boundary lines whose patterns are different from the shift-up boundary lines of FIG. 4.

The manual shifting control means 210 is operated when the manual shift mode detecting means 206 detects that the shift mode has been changed from the automatic shift mode to the manual shift mode with the MANUAL SHIFT MODE selector switch 90 turned ON. The manual shifting control means 210 controls the shifting of the automatic transmission 14 in response to the operation of the manual shifting device 92 (shift-up and shift-down switches 98, 100), irrespective of the determination by the shift control means 208 on the basis of the detected throttle opening angle $\theta_{TH}$ and vehicle speed V and according to the shift boundary lines. In the manual shift mode, the position of the automatic transmission 14 established by operation of the manual shifting device 92 is maintained until the manual shifting device 92 is again operated, or until the manual shift mode is cancelled, that is, until the shift lever 72 is restored to the drive position "D". When the shift-down switch 100 is operated in the manual shift mode, the engine brake is applied to the vehicle.

The manual shifting control inhibiting means 212 is operated when the turning stability control detecting means 204 detects an operation of the turning stability control means 200. The manual shifting control inhibiting means 212 inhibits the shift control means 208 from operating according to a manual shifting command generated by the manual shifting control means 210, while enabling or commanding the shift control means 208 to operate according to a stability control command generated by the turning stability control means 200. For example, if the turning stability control means 200 generates a transmission hold command for holding the automatic transmission 14 in the presently established position while the manual shifting control means 210 receives a manual shifting command generated from the manual shifting device 92 for shifting up or down the automatic transmission 14, the manual shifting control inhibiting means 212 cancels or invalidates the manual shifting command received from the manual shifting control means 210, and commands the shift control means 208 to operate according to the transmission hold command from the turning stability control means 200, so that the automatic transmission 14 is held in the presently established position. Under some condition, the turning stability control means 200 generates a stability control shifting command for shifting the automatic transmission 14 in one direction (shift-up or shift-down direction) while the manual shifting control means 210 generates a manual shifting command for shifting the automatic transmission 14 in the opposite direction. In this case, the manual shifting control inhibiting means 212 commands the shift control means 208 to shift the automatic transmission 14 in the above-indicated one direction according to the stability control shifting command from the turning stability control means 200. In this case, the manual shifting command is not cancelled or invalidated, and the automatic transmission 14 is shifted according to this manual shifting command after the turning stability control operation by the turning stability control means 200 is terminated. If the shifting directions according to the stability control shifting command and the manual shifting command are the same, the manual shifting control inhibiting means 212 commands the shift control means 208 to operate according to the stability control shifting command from the turning stability control means 200, and cancels or invalidates the manual shifting command. In this case, the automatic transmission 14 will not be shifted according to the manual shifting command even after the operation of the turning stability control means 200 is terminated.

The transmission holding means 214 is operated when the turning stability control detecting means 204 detects that the turning stability control means 200 is not in operation, after this means 200 is once operated. That is, the transmission holding means 214 is operated when the turning stability control operation by the turning stability control means 200 is terminated. The transmission holding means 214 commands the shift control means 208 to hold the automatic transmission 14 in the position established upon termination of the turning stability control operation.

Referring next to the flow chart of FIG. 9, there will be described a shifting control routine executed by the vehicle control apparatus including the transmission controller 78.

Figure 9A:
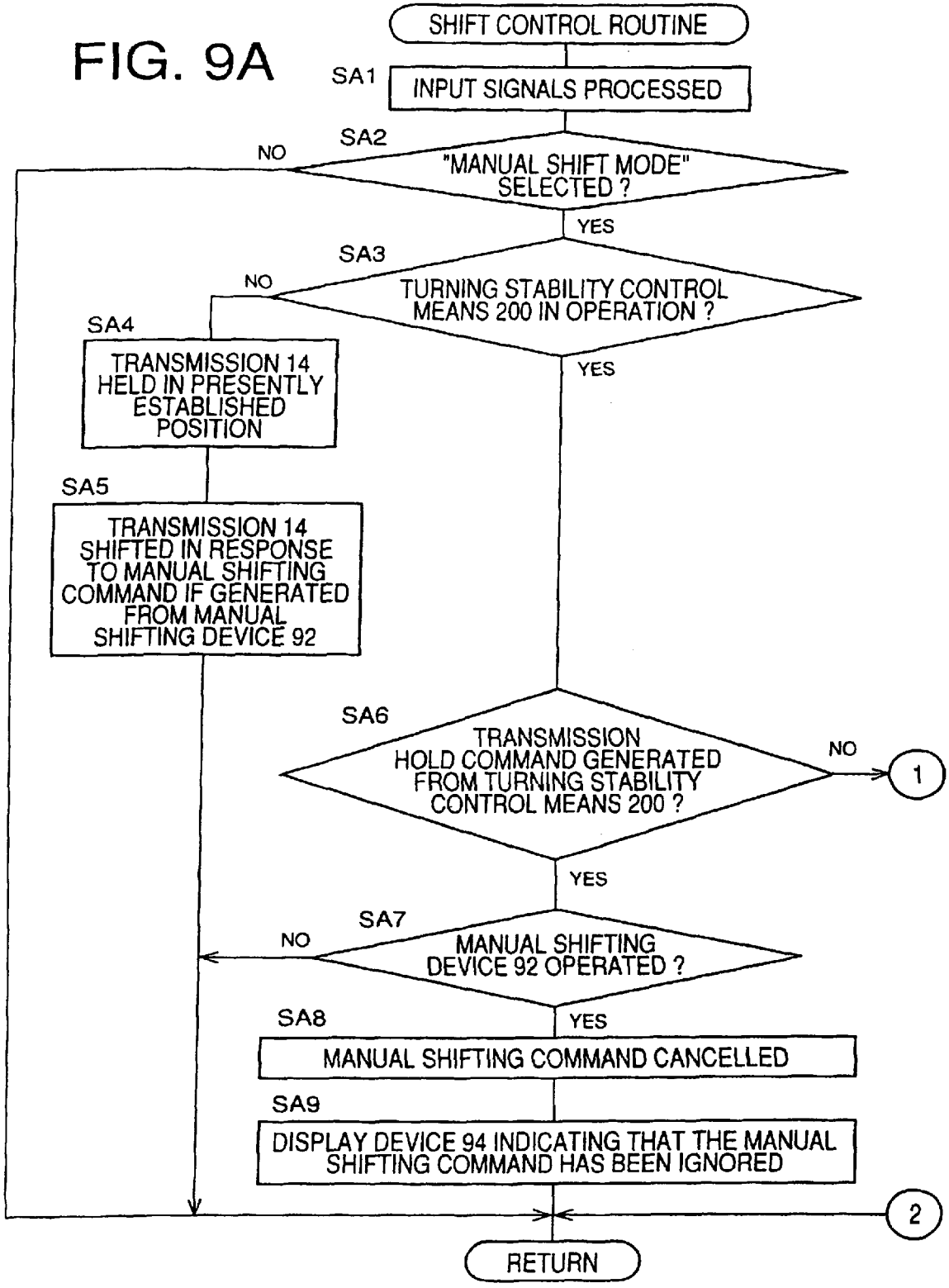
FIGS. 9A and 9B are a flow chart illustrating an operation of the transmission controller.
Figure 9B:
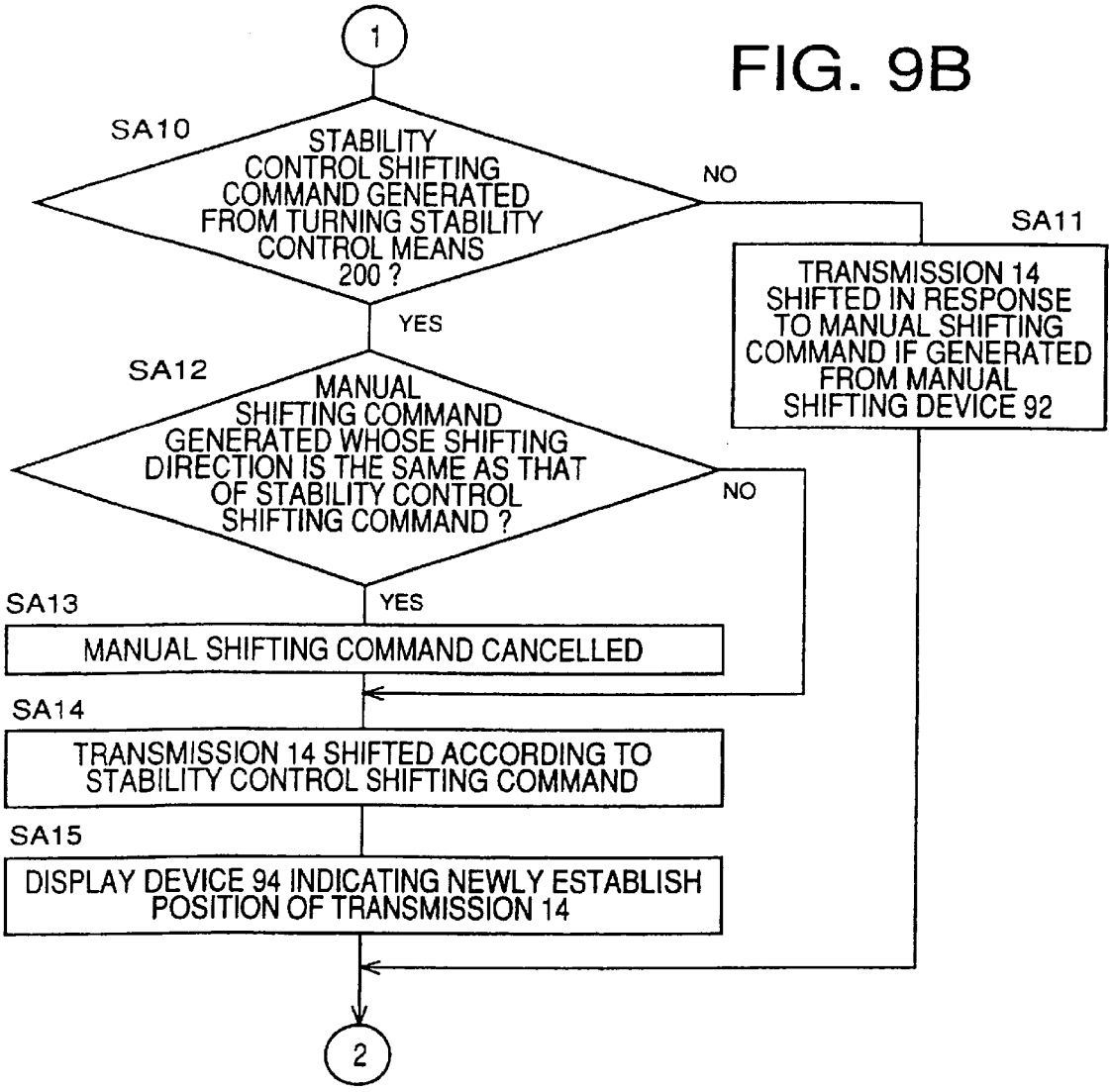

The shift control routine of FIG. 9 is initiated with step SA1 in which various input signals are read in and processed. Step SA1 is followed by step SA2 corresponding to the manual shift mode detecting means 206, to determine whether the manual shift mode is presently established. This determination is effected on the basis of the output signal of the MANUAL SHIFT MODE selector switch 90. If a negative decision (NO) is obtained in step SA2, one cycle of execution of the routine is terminated. If an affirmative decision (YES) is obtained in step SA2, the control flow goes to step SA3 corresponding to the turning stability control detecting means 204, to determine whether the turning stability control means 200 is in operation. This determination is effected on the basis of the output signals of the vehicle stability controller 82.

If a negative decision (NO) is obtained in step SA3, the control goes to step SA4 in which the shift control means 208 commands the automatic transmission 14 to be held in the presently established position. Step SA4 is followed by step SA5 corresponding to the manual shifting control means 210, in which the shift control means 208 commands the automatic transmission 14 to be shifted up or down in response to a manual shifting command if generated from the manual shifting device 92 (shift-up or shift-down switch 98, 100). If the shift-up switch 98 is operated once, for instance, the automatic transmission 14 is commanded to be shifted up by one position from the presently established position. If the shift-down switch 100 is operated once, the automatic transmission 14 is commanded to be shifted down by one position.

If the turning stability control means 200 is in operation, an affirmative decision (YES) is obtained in step SA3, and the control flow goes to step SA6 to determine whether a transmission hold command has been generated by the turning stability control means 200 for holding the automatic transmission 14 in the presently established position. If an affirmative decision (YES) is obtained in step SA6, the control flow goes to step SA7 to determine whether the manual shifting device 92 has been operated to generate a manual shifting command. This determination is effected on the basis of the output signals of the shift-up and shift-down switches 90, 100. If a negative decision (NO) is obtained in step SA7, one cycle of execution of the routine is terminated. If an affirmative decision (YES) is obtained in step SA7, the control flow goes to step SA8 in which the manual shifting command which has been generated from the shift-up or shift-down switch 98, 100 and received by the manual shifting control inhibiting means 212 through the manual shifting control means 210 is cancelled or invalidated by the manual shifting control inhibiting means 212. As a result, the shift control means 208 commands the automatic transmission 14 to be held in the presently established position according to the transmission hold command from the turning stability control means 200. Then, the control flow goes to step SA9 in which the display device 94 is activated to provide an indication that the manual shifting command has been cancelled.

If a negative decision (NO) is obtained in step SA6, the control flow goes to step SA10 to determine whether a stability control shifting command has been generated from the turning stability control means 200 to shift up or down the automatic transmission 14 for improving the turning stability of the vehicle. If a negative decision (NO) is obtained in step SA10, the control flow goes to step SA11 identical with step SA5, in which the shift control means 208 commands the automatic transmission 14 to be shifted up or down in response to a manual shifting command if generated from the manual shifting device 92 (shift-up or shift-down switch 98, 100).

If an affirmative decision (YES) is obtained in step SA10, the control flow goes to step SA12 to determine whether a manual shifting command has been generated from the shift-up or shift-down switch 98, 100 to shift the automatic transmission 14 in the same direction as the shifting direction of the stability control shifting command generated by the turning stability control means 200. If an affirmative decision (YES) is obtained in step SA12, the control flow goes to step SA13 corresponding to the manual shifting control inhibiting means 212, in which the manual shifting command is cancelled or invalidated, and then goes to step SA14 in which the automatic transmission 14 is shifted by the shift control means 208 according to the stability control shifting command from the turning stability control means 200. If a negative decision (NO) is obtained in step SA12, the control flow goes to step SA14, while skipping step SA13.

The negative decision (NO) is obtained in step SA12 in two cases, namely, in a first case where the manual shifting command has been generated by the shift-up or shift-down switch 98, 100, but the shifting direction according to the manual shifting command is opposite to that according to the stability control shifting command, and in a second case where no manual shifting command has been generated by the shift-up or shift-down switch 98, 100.

If, for example, the vehicle operator manipulates the shift-down switch 100 while the vehicle is running on a frozen or snow-covered road surface having a considerably low friction coefficient, the drive wheels may slip on the road surface, resulting in deterioration of the turning stability of the vehicle. In this case, the turning stability control means 200 may generate a stability control shift-up command to shift up the automatic transmission 14 for improving the turning stability of the vehicle. In this case, therefore, no manual shifting command is generated as in the second case described above, and the negative decision (NO) is obtained in step SA12, and step SA14 is implemented to shift up the automatic transmission 14 according to the stability control shift-up command generated by the turning stability control means 200.

Step SA14 is followed by step SA15 in which the display device 94 provides an indication of the position of the automatic transmission 14 which is newly established according to the stability control shifting command from the turning stability control means 200. If the negative decision (NO) is obtained in step SA3 due to termination of the operation of the turning stability control means 200 after repeated execution of the routine of FIG. 9, the control flow goes to step SA4 corresponding to the transmission holding means 214, to hold the automatic transmission 14 in the presently established position.

It will be understood that steps SA6 through SA14 correspond to the manual shifting control inhibiting means 212.

In the present embodiment, the manual shifting control inhibiting means 212 corresponding to steps SA6–SA14 commands the shift control means 208 to operate according to the command generated by the turning stability control means 200, while cancelling or invalidating the command generated by the manual shifting device 92 (shift-up and shift-down switches 98, 100), while the turning stability control operation of the turning stability control means 200 is detected by the turning stability control detecting means 204 corresponding to step SA3. This arrangement is effective to prevent the conventionally encountered drawbacks due to interferences between the operation of the turning stability control means 200 and the operation of the manual shifting control means 210. If, for example, the transmission hold command is generated by the turning stability control means 200 while the manual shifting command is generated by the manual shifting device 92 in the manual shift mode, the shift control means 208 is operated according to the transmission hold command to hold the automatic transmission 14 in the presently established position, irrespective of the manual shifting command for shifting up or down the automatic transmission 14. Accordingly, the turning stability of the vehicle is not deteriorated by the shift-up or shift-down action of the automatic transmission 14.

Further, the manual shifting control means 212 cancels or invalidates the manual shifting command generated by the manual shifting device 92 and received from the manual shifting control means 210, if the shifting direction of the automatic transmission 14 according to the manual shifting command is the same as the shifting direction according to the stability control shifting command generated by the turning stability control means 200. Thus, the turning stability control by the turning stability control means 200 is given priority or preference to the manual shifting action of the automatic transmission 14 by the manual shifting control means 210. In this respect, it is noted that the manual shifting command is cancelled and is not executed even after the shifting action according to the stability control shifting command or after the termination of the turning stability control by the turning stability control means 200.

The present embodiment is further adapted such that the transmission holding means 214 corresponding to step SA4 commands the shift control means 208 to hold the automatic transmission 14 in the presently established position when the operation of the turning stability control means 200 is terminated, that is, when the termination of the turning stability control operation is detected by the turning stability control detecting means 204. Thus, the automatic transmission 14 is held in the last established position until the manual shifting control means 210 commands the shift control means 208 to shift the automatic transmission 14 according to a manual shifting command subsequently generated from the manual shifting device 92. Accordingly, the transmission holding means 214 is effective to prevent an unnecessary shift-up or shift-down action of the automatic transmission 14 immediately after the termination of the turning stability control operation.

If the shifting direction of the automatic transmission 14 according to the stability control shifting command generated from the turning stability control means 200 is the same as the shifting direction according to the manual shifting command generated from the manual shifting device 92, the manual shifting control inhibiting means 212 cancels the manual shifting command as described above, and commands the shift control means 208 to shift the automatic transmission 14 in the shift-up or shift-down direction according to the stability control shifting command. If the shifting directions according to the stability control shifting command and the manual shifting command are opposite to each other, the manual shifting control inhibiting means 212 commands the shift control means 208 to shift the automatic transmission 14 in the direction according to the stability control shifting command. In this case, the manual shifting command is not cancelled or invalidated, so that the automatic transmission 14 is shifted according to the manual shifting command after the shifting action of the automatic transmission 14 according to the stability control shifting command or after the operation of the turning stability control means 200.

While the presently preferred embodiment has been described above by reference to FIGS. 1–9, it is to be understood that the present invention may be otherwise embodied.

In the illustrated embodiment, the shift-up and shift-down switches 98, 100 which are operable in the manual shift mode are operated by the vehicle operator to directly shift up or down the automatic transmission 14 as desired. However, these shift-up and shift-down switches 98, 100 may be used to change the number of the selectable forward-drive positions of the automatic transmission 14 which can be established. The hydraulic control device 79 have the three range positions corresponding to the three forward-drive positions "D", "3" and "2" of the shift lever 72. As described above, the number of the selectable forward-drive positions of the automatic transmission 14 that can be established is changed depending upon the presently established forward-drive position of the shift lever 72 in the automatic shift mode. If the shift-down and shift-up switches 98, 100 are adapted to select one of the three range positions of the hydraulic control device 79 without operating the shift lever 72, the number of the selectable forward-drive positions of the automatic transmission 14 can be changed in the manual shift mode with the shift lever 72 placed in the position "DM". Therefore, if the shift-down switch 98 is operated to electrically control the solenoid-operated valves of the hydraulic control device 79 to newly establish the range position corresponding to the THIRD position "3", while the range position corresponding to the DRIVE position "D" is presently established, for example, the automatic transmission 14 may be shifted down from the fourth-speed position "4th" to the third-speed position "3rd", since the fourth-speed position is not available in the range position corresponding to the THIRD position "3". In this case, the engine brake may be applied to the vehicle. Thus, the shift-up or shift-down switches 98, 100 can be used to shift up or down the automatic transmission 14, by changing the presently established range position of the hydraulic control device 79 with the shift lever 72 held in the position "DM". In this arrangement, too, the command generated by the switch 98, 100 to change the range position of the hydraulic control device 79 is cancelled in steps SA8 and SA13.

In the illustrated embodiment, the MANUAL SHIFT MODE selector switch 90 is turned ON when the shift lever 72 is operated to the position "DM". However, the selector switch 90 may be replaced by a manually operated two-position or pushbutton switch provided on the steering wheel 96 or a steering column by which the steering wheel 96 is rotatably supported.

Figure 10:
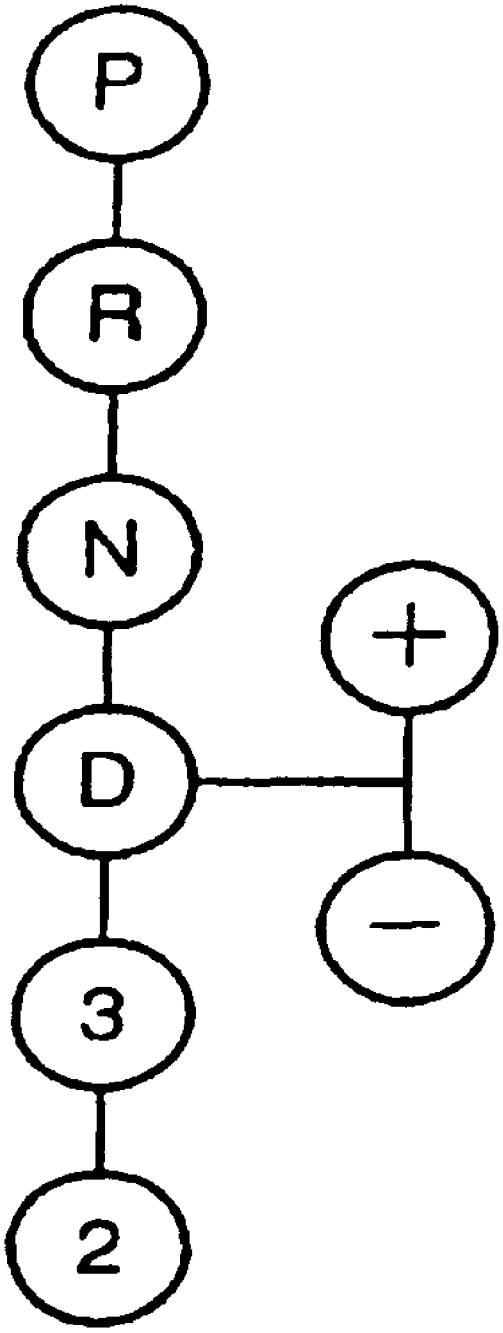
FIG. 10 is a view showing the operating positions of a shift lever in a second embodiment of the invention.

While the manually operated shift-up and shift-down switches 98, 100 are provided on the steering wheel 96, these switches may be replaced by other manually operated switches, for instance, two switches which are turned ON when a shift lever having positions "+" and "–" other than the positions "P", "R", "M", "D", "3" and "2" as shown in FIG. 10 is operated to the positions "+" and "–", respectively.

It is to be understood that the present invention may be embodied with various other changes, modifications or improvements, which may occur to those skilled in the art, without departing from the spirit and scope of the invention defined in the following claims:

What is claimed is:

1. An apparatus for controlling an automotive vehicle having an engine and an automatic transmission having a plurality of [hydraulically operated frictional coupling devices] *speed ratios*, said apparatus comprising:

running stability control means operated upon reduction of stability of running of the vehicle below a predetermined threshold, for controlling at least one of an output of said engine, a braking force applied to the vehicle and an established position of said automatic transmission, so as to improve the stability of running of the vehicle;

manual shifting control means responsive to an operation of a manual shifting device, for shifting said automatic transmission;

running stability control detecting means for detecting an operation of said running stability control means; and manual shifting control inhibiting means, operable upon detection of said operation of said running stability control means by said running stability control detecting means, for inhibiting an operation of said manual shifting control means while said running stability control means is operated to control said automatic transmission.

2. An apparatus according to claim 1, further comprising:

shift control means connected to said running stability control means and said manual shifting control means, for controlling said automatic transmission, said shift control means having an automatic shift mode in which said automatic transmission is automatically shifted depending upon a running condition of the vehicle, and a manual shift mode in which said manual shifting device is operable; and shift mode determining means for determining whether said shift control means is placed in said automatic shift mode or in said manual shift mode, and wherein said manual shifting control means commands said shift control means to shift said automatic transmission according to a manual shifting command generated by said manual shifting device when said shift mode determining means determines that said shift control means is placed in said manual shift mode, said manual shifting control inhibiting means inhibiting the operation of said manual shifting control means according to said manual shifting command while said running stability control means is operated to control said automatic transmission.

3. An apparatus according to claim 1, *wherein said automatic transmission has a plurality of hydraulically operated devices, said apparatus* further comprising:

a hydraulic control device for controlling said plurality of hydraulically operated frictional coupling devices, said hydraulic control device having a plurality of range positions which are selectively established and in which the automatic transmission have respective different numbers of forward-drive positions that can be established for forward running of the vehicle;

shift control means connected to said said hydraulic control device, said running stability control means, said manual shifting control means, for controlling said frictional coupling devices of said automatic transmission, said shift control means having an automatic shift mode in which said automatic transmission is automatically shifted depending upon a running condition of the vehicle, and a manual shift mode in which said manual shifting device is operable; and shift mode determining means for determining whether said shift control means is placed in said automatic shift mode or in said manual shift mode, and wherein said manual shifting control means commands said shift control means to select one of said plurality of range positions of said hydraulic control device according to a manual shifting command generated by said manual shifting device when said shift mode determining means determines that said shift control means is placed in said manual shift mode, said manual shifting control inhibiting means inhibiting the operation of said manual shifting control means according to said manual shifting command while said running stability control means is operated to control said automatic transmission.

4. An apparatus according to claim 1, wherein said manual shifting control device is operated to generate a manual shifting command for shifting said automatic transmission in said manual shift mode, and said running stability control means generates a stability control command for controlling said automatic transmission for improving the stability of running of the vehicle, and wherein said manual shifting control inhibiting means cancelling said manual shifting command to thereby inhibit the operation of said manual shifting control means while said stability control command is generated by said running stability control means.

5. An apparatus according to claim 1, further comprising transmission holding means operable when said running stability control detecting means detects that the operation of said running stability control means is terminated, said transmission holding means holding said automatic transmission in a position thereof which is established upon termination of the operation of said running stability control means.

6. An apparatus according to claim 1, wherein said manual shifting control device is operated to generate a manual shifting command for shifting said automatic transmission in said manual shift mode, and said running stability control means generates a stability control shifting command for shifting said automatic transmission for improving the stability of running of the vehicle, and wherein said manual shifting control inhibiting means cancels said manual shifting command generated by said manual shifting device if a shifting direction in which said automatic transmission is to be shifted according to said manual shifting command is the same as a shifting direction in which said automatic transmission is to be shifted according to said stability control shifting command generated by said running stability control means, said manual shifting control inhibiting means permitting said automatic transmission to be shifted according to said stability control shifting command, if said shifting direction according to said manual shifting command is the same as said shifting direction according to said stability control shifting command.

7. An apparatus according to claim 1, wherein said manual shifting control device is operated to generate a manual shifting command for shifting said automatic transmission in said manual shift mode, and said running stability control means generates a stability control shifting command for shifting said automatic transmission for improving the stability of running of the vehicle, and wherein said manual shifting control inhibiting means permitting said automatic transmission to be shifted according to said stability control shifting command generated by said running stability control means, if a shifting direction in which said automatic transmission is to be shifted according to said stability control shifting command is opposite to a shifting direction in which said automatic transmission is to be shifted according to said manual shifting command, said manual shifting control inhibiting means holding said manual shifting command effective so that said automatic transmission is shifted according to said manual shifting command after said operation of said running stability control means.

8. An apparatus according to claim 1, wherein said running stability control means comprises turning stability control means for controlling at least one of the output of said engine and said braking force applied to the vehicle, for improving stability of turning of the vehicle.

9. An apparatus according to claim 1, wherein said manual shifting device includes at least one manually operated switch which is operable in a manual shift mode.

10. An apparatus according to claim 9, wherein the automotive vehicle has a manually operated shift lever having a plurality of forward-drive positions corresponding to respective different numbers of selectable forward-drive positions of the automatic transmission that can be established for forward running of the vehicle, and another position in which said manual shift mode is established.

11. An apparatus according to claim 9, wherein said at least one manually operated switch is provided on a steering wheel (96) for steering the automotive vehicle.

* * * * *

UNITED STATES PATENT AND TRADEMARK OFFICE

CERTIFICATE OF CORRECTION

PATENT NO. : RE 37, 513 E
DATED : January 15, 2002
INVENTOR(S) : Tabata et al.

It is certified that error appears in the above-identified patent and that said Letters Patent is hereby corrected as shown below:

Title page,
Item [75], the third Inventor's name is listed incorrectly. Item [75] should read as follows:

-- [75] Inventors: Atsushi Tabata, Okazaki; Hideo Tomomatsu, Nagoya; Kagenori Fukumura, Toyota; Hiroji Taniguchi, Okazaki, all of (JP) --

Signed and Sealed this

Tenth Day of September, 2002

*Attest:*

*Attesting Officer*

JAMES E. ROGAN
*Director of the United States Patent and Trademark Office*